(12) United States Patent
Chae

(10) Patent No.: US 12,271,457 B2
(45) Date of Patent: Apr. 8, 2025

(54) METHOD AND APPARATUS FOR DEEP LEARNING-BASED REAL-TIME ON-DEVICE AUTHENTICATION

(71) Applicant: NOTA, INC., Daejeon (KR)

(72) Inventor: Myungsu Chae, Daejeon (KR)

(73) Assignee: NOTA, INC., Daejeon (KR)

( * ) Notice: Subject to any disclaimer, the term of this patent is extended or adjusted under 35 U.S.C. 154(b) by 371 days.

(21) Appl. No.: 17/843,768

(22) Filed: Jun. 17, 2022

(65) Prior Publication Data

US 2022/0318359 A1  Oct. 6, 2022

Related U.S. Application Data

(63) Continuation of application No. PCT/KR2020/001618, filed on Feb. 4, 2020.

(30) Foreign Application Priority Data

Dec. 19, 2019 (KR) .................. 10-2019-0170529
Jan. 28, 2020 (KR) .................. 10-2020-0009739

(51) Int. Cl.
*G06F 21/32* (2013.01)
*G06N 3/04* (2023.01)
*G06V 10/77* (2022.01)
*G06V 10/82* (2022.01)
*G06V 40/16* (2022.01)

(52) U.S. Cl.
CPC ............ *G06F 21/32* (2013.01); *G06N 3/04* (2013.01); *G06V 10/7715* (2022.01); *G06V 10/82* (2022.01); *G06V 40/168* (2022.01); *G06V 40/172* (2022.01)

(58) Field of Classification Search
None
See application file for complete search history.

(56) References Cited

U.S. PATENT DOCUMENTS

| | | | |
|---|---|---|---|
| 2017/0169315 A1* | 6/2017 | Vaca Castano | G06V 10/25 |
| 2018/0260415 A1 | 9/2018 | Gordo Soldevila et al. | |
| 2019/0251333 A1* | 8/2019 | Wang | G06V 10/764 |
| 2019/0294860 A1* | 9/2019 | Jin | G06V 40/172 |
| 2022/0094842 A1* | 3/2022 | Fujiwara | G06N 3/045 |

FOREIGN PATENT DOCUMENTS

| | | |
|---|---|---|
| KR | 10-2003-0046181 B1 | 6/2003 |
| KR | 10-2018-0037436 A | 4/2018 |
| KR | 10-2019-0116397 A | 10/2019 |

\* cited by examiner

*Primary Examiner* — Nelson S. Giddins
(74) *Attorney, Agent, or Firm* — CHRISTENSEN O'CONNOR JOHNSON KINDNESS PLLC

(57) ABSTRACT

Disclosed are a method and apparatus for real-time on-device authentication based on deep learning. A deep learning-based authentication method includes detecting a location of a region of interest (ROI) occupied by a face portion an input image by using a detection model, extracting a feature map from the input image by using a feature extractor of the detection model, extracting a fixed length feature for the face portion using the feature map and ROI pooling for the detected location of the ROI, and classifying a face included in the input image based on the fixed length feature.

8 Claims, 6 Drawing Sheets

METHOD AND APPARATUS FOR DEEP LEARNING-BASED REAL-TIME ON-DEVICE AUTHENTICATION

CROSS-REFERENCES TO RELATED APPLICATIONS

This is a continuation of International Application No. PCT/KR2020/001618, filed Feb. 4, 2020, which claims the benefit of Korean Patent Application No. 10-2019-0170529, filed on Dec. 19, 2019, and Korean Patent Application No. 10-2020-0009739, filed on Jan. 28, 2020, the disclosures of which are incorporated herein by reference in their entirety.

TECHNICAL FIELD

The following description relates to an authentication technology for identifying the identity of a user.

BACKGROUND OF THE DISCLOSURE

Bio authentication (or fast identity online) is a technology using personal unique bio information, such as a fingerprint, an iris, a face, or a voice, in order to identify the identity of a user.

Fact recognition is one of commonly used bio authentication technologies, and is used in various security systems, such as a smart door, a smartphone, and a laptop computer by replacing the existing number key-based authentication system.

For example, Korean Patent No. 10-0456619 (registered on Nov. 1, 2004) discloses a technology for selecting a feature set having an excellent discrimination for each face in a face registration process and enabling face-based authentication under a restricted environment by using only a feature set selected in a learning process in an authentication process.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Embodiments provide a method and apparatus capable of performing face-based authentication with a smaller computational load by minimizing operations performed in a face detector and a face classifier in a deep learning-based authentication technology.

In a deep learning-based authentication method executed in a computer device, the computer device includes at least one processor configured to execute computer-readable instructions included in a memory. The deep learning-based authentication method includes detecting, by the at least one processor, a location of a region of interest (ROI) occupied by a face portion in an input image by using a detection model, extracting, by the at least one processor, a feature map from the input image by using a feature extractor of the detection model, extracting, by the at least one processor, a fixed length feature for the face portion using the feature map and ROI pooling for the detected location of the ROI, and classifying, by the at least one processor, a face included in the input image based on the fixed length feature.

According to an aspect, extracting the fixed length feature may include performing the ROI pooling in the highest layer closest to the output layer of the detection model.

According to another aspect, extracting the fixed length feature may include performing the ROI pooling in each of a plurality of layers of the detection model.

According to still another aspect, extracting the fixed length feature may further include performing convolution between layers in which the ROI pooling has been performed.

A computer device includes at least one processor implemented to execute computer-readable instructions included in a memory. The at least one processor processes a process of detecting a location of a region of interest (ROI) occupied by a face portion in an input image by using a detection model, a process of extracting a feature map from the input image by using a feature extractor of the detection model, a process of extracting a fixed length feature for the face portion using the feature map and ROI pooling for the detected location of the ROI, and a process of classifying a face included in the input image based on the fixed length feature.

According to embodiments of the present disclosure, face-based authentication can be performed with a smaller computational load by minimizing operations performed in a face detector and a face classifier in the deep learning-based authentication technology.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments of the present disclosure are described in detail with reference to the accompanying drawings.

Embodiments of the present disclosure relate to an authentication technology for identifying the identity of a user.

Embodiments including contents specifically described in this specification can minimize operations in a face detector and a face classifier in a deep learning-based authentication technology. Accordingly, significant advantages are achieved in terms of system complexity, authentication performance, a cost reduction, etc.

Figure 1:
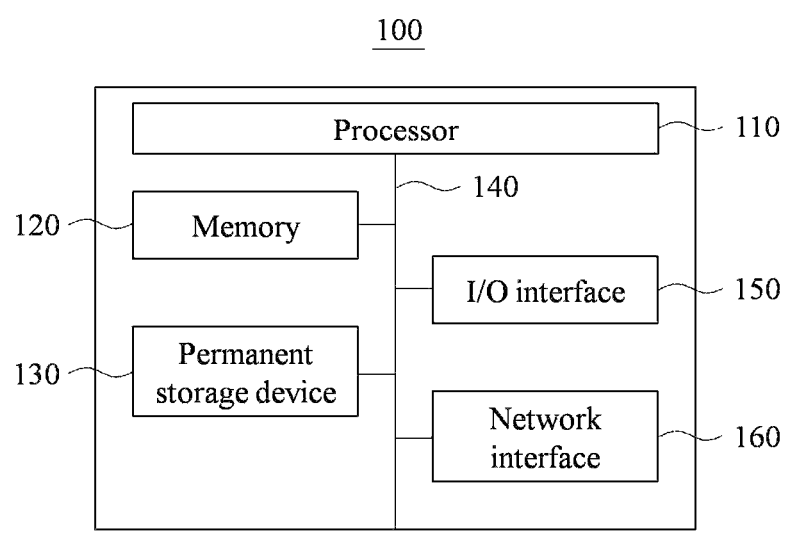
FIG. 1 is a block diagram for describing an example of internal components of a computer device in an embodiment of the present disclosure.

FIG. 1 is a block diagram for describing an example of internal components of a computer device in an embodiment of the present disclosure. For example, a face-based authentication system according to embodiments of the present disclosure may be implemented by a computer device 100 of FIG. 1. As illustrating in FIG. 1, the computer device 100 may include a processor 110, a memory 120, a permanent storage device 130, a bus 140, an input/output (I/O) interface 150, and a network interface 160 as component for executing an authentication method.

The processor 110 is a component for face-based authentication, and may include an arbitrary device capable of processing a sequence of instructions or may be a part of the arbitrary device. The processor 110 may include a computer processor, a mobile device or a processor and/or a digital processor within another electronic device, for example. The processor 110 may be included in a server computing device, a server computer, a series of server computers, a server farm, a cloud computer, or a content platform, for example. The processor 110 may be connected to the memory 120 through the bus 140.

The memory 120 may include a volatile memory, a permanent memory, a virtual memory or other memories for storing information which is used or outputted b y the computer device 100. The memory 120 may include a random access memory (RAM) and/or a dynamic RAM (DRAM), for example. The memory 120 may be used to store arbitrary information, such as state information of the computer device 100. The memory 120 may also be used to store instructions of the computer device 100, which include instructions for face-based authentication, for example. The computer device 100 may include one or more processors 110, if necessary or if appropriated.

The bus 140 may have a communication-based structure which enables an interaction between various components of the computer device 100. The bus 140 may carry data between components of the computer device 100, for example, between the processor 110 and the memory 120. The bus 140 may include wireless and/or wired communication media between components of the computer device 100, and may include parallel, serial or other topology arrays.

The permanent storage device 130 may include components a memory or another permanent storage device, such as that used by the computer device 100 in order to store data for given extended period (e.g., compared to the memory 120). The permanent storage device 130 may include a non-volatile main memory, such as that used by the processor 110 within the computer device 100. The permanent storage device 130 may include a flash memory, a hard disc, an optical disc, or other computer-readable media, for example.

The I/O interface 150 may include interfaces for a keyboard, a mouth, a voice command input, a display, or other input or output devices. Configuration instructions and/or an input for authentication may be received through the I/O interface 150.

The network interface 160 may include one or more interfaces for networks, such as a short-distance network or the Internet. The network interface 160 may include interfaces for wired or wireless connections. Configuration instructions and/or an input for authentication may be received through the network interface 160.

Furthermore, in other embodiments, the computer device 100 may include more components than the components of FIG. 1. However, most of conventional components do not need to be clearly illustrated. For example, the computer device 100 may be implemented to include at least some of I/O devices connected to the I/O interface 150 or may further include other components, such as a transceiver, a global positioning system (GPS) module, a camera, various sensors, and a database.

Hereinafter, a detailed embodiment of a method of performing authentication based on a deep learning model is described.

In general, a face-based authentication system means a system for finding multiple faces in a given image (or photo) and responding to whether each of the faces is a face previously registered with a database.

The authentication system is basically divided into a registration step for face-based authentication and a verification test for face-based authentication.

Figure 2:
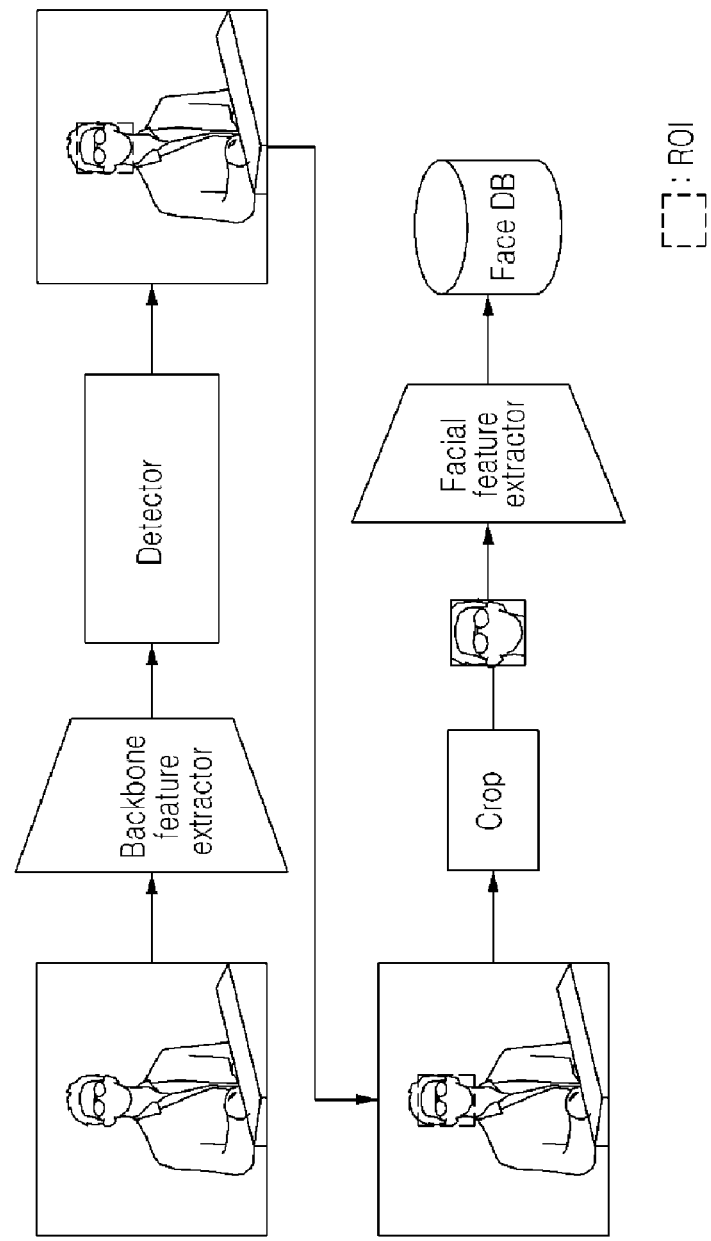
FIG. 2 is a flowchart illustrating a face-based verification registration process.
Figure 3:
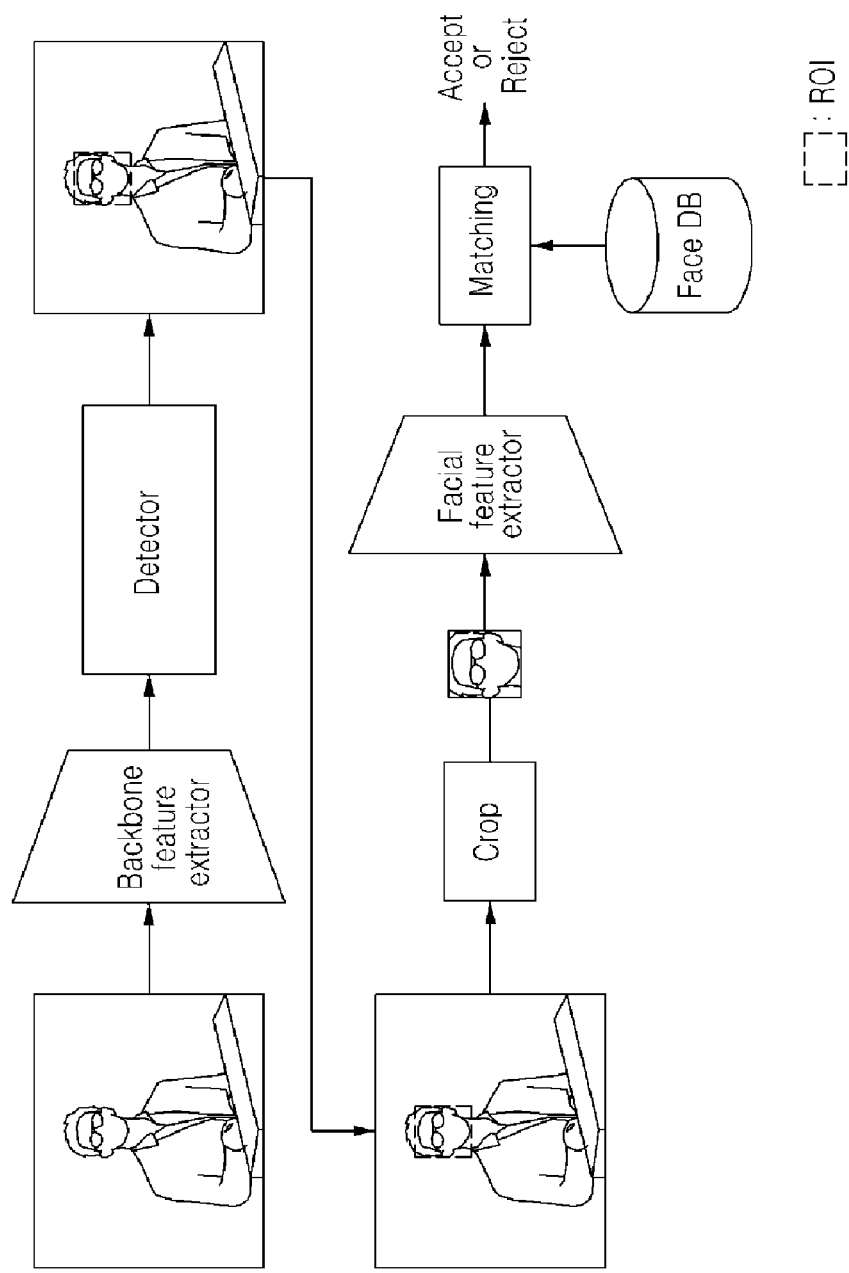
FIG. 3 is a flowchart illustrating a face-based verification test.

FIG. 2 is a flowchart illustrating a face-based verification registration process. FIG. 3 is a flowchart illustrating a face-based verification test.

Referring to FIGS. 2 and 3, the authentication system may include a face detector for detecting a location of a region of interest (ROI) of the entire image, which is occupied by a face portion of a person, and a facial feature extractor for extracting who a corresponding face is based on an ROI detected by the face detector.

Representative models of a deep learning model (e.g., a detection model) corresponding to the face detector include You Only Look Once (YOLO), a single shot multibox detector (SSD), etc., and may use, as a backbone feature extractor, models, such as residual neural network (ResNet), visual geometry group (VGG), MobileNet, which perform pre-training based on an ImageNet dataset.

In this case, the deep learning model used as the backbone feature extractor is a model similar to a deep learning model (e.g., a classification model) used in a face classifier in structure, and has in common that a feature point is analyzed from an image.

The backbone feature extractor is trained by connecting the backbone feature extractor and the face detector and training a face detection model. One of learning methods that are most widely known is a VGGFace model.

Figure 4:
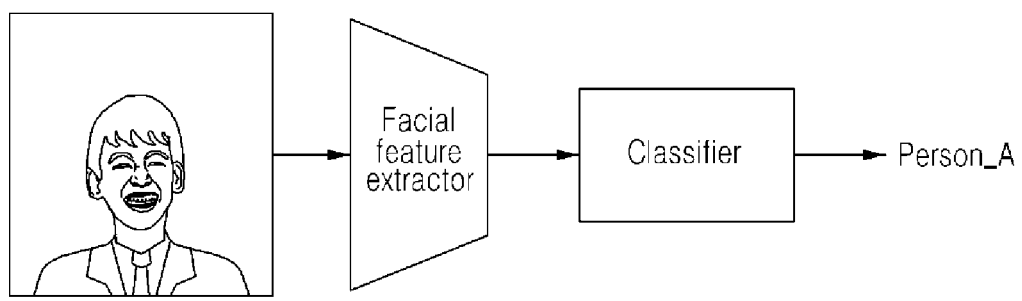
FIG. 4 is a flowchart illustrating a deep learning model pre-training process for a facial feature extractor.

As illustrating in FIG. 4, in the case of the facial feature extractor, after a model is trained so that a face is classified, a classifier portion may be obviated and a middle hidden activation function may be used as a feature.

As illustrating in FIGS. 2 and 3, a common authentication system performs the face-based authentication by inputting an image to the facial feature extractor again separately from an operation of the backbone feature extractor.

However, the existing authentication system has the waste of an operation because an operation performed in the facial feature extractor is similar to an operation performed in the backbone feature extractor.

Embodiments of the present disclosure propose a method capable of performing authentication with a smaller computational load by minimizing operations of a face detector and a face classifier in a deep learning-based authentication model.

Object Classification

An object classifier including a face is a model that responds whether a given image corresponds to which object. A current system using deep learning performs feature extraction and classification by using only a neural network.

In this case, the neural network has a hierarchical structure. A low layer (a layer close to data) is trained to have a form of a general feature, such as an edge filter or a corner filter. Learning is performed on a special form, such as an object part, in a high layer (a layer close to a label).

A feature of the low layer has a similar form regardless of a label used to train a corresponding model. A computational load in a model classifier can be reduced by using information of a model detector in the model classifier based on such a feature.

Feature Map

A feature map means an image having a form, which is obtained as an output of an input image through a feature extractor. The size of the feature map is changed in proportion to the size of the input image.

Values of specific coordinates of the feature map correspond to values of the image. If the feature extractor is an extractor for extracting a red feature, for example, when specific coordinates of the feature map have a high value, image coordinates corresponding to coordinates of the feature map indicate a red color in an input image.

If an ROI corresponding to a face portion of an image is cropped, feature information previously operated through cropping from a feature map may be used.

ROI Pooling

ROI pooling means a scheme for performing pooling based on a desired size and ratio in a desired area. A feature map having an arbitrary size at a desired location may be pooled as a fixed length feature on the feature map by using ROI pooling.

Figure 5:
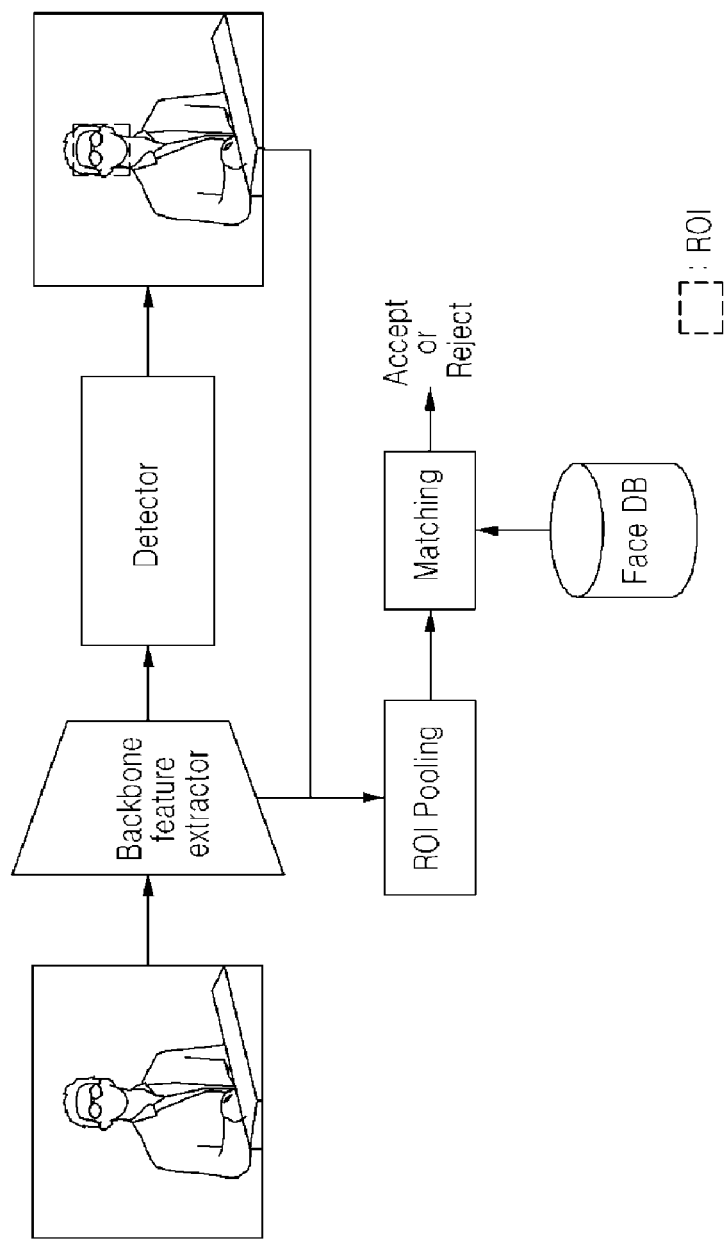
FIG. 5 is a flowchart illustrating an example of a deep learning-based authentication method which may be performed by the computer device according to an embodiment of the present disclosure.

FIG. 5 is a flowchart illustrating an example of a deep learning-based authentication method which may be performed by the computer device according to an embodiment of the present disclosure.

Referring to FIG. 5, the deep learning-based authentication system according to an embodiment of the present disclosure may omit a new feature extractor (a facial feature extractor for classification), may obtain a fixed length feature through the existing feature extractor (a backbone feature extractor for detection) through ROI pooling, may register the fixed length feature with a face database (DB), and may then perform face-based authentication by using the registered fixed length feature in a subsequent verification step. For example, the deep learning-based authentication system may detect a location of an ROI occupied by a face portion in an input image by using a detection model, that is, a deep learning model corresponding to a face detector, and may extract a feature map of the input image by using a feature extractor of the detection model. Thereafter, the deep learning-based authentication system may extract a fixed length feature for a face portion using the extracted feature map and ROI pooling for the location of the ROI, and may classify a face included in the input image by using the extracted fixed length feature. In other words, the deep learning-based authentication system may classify the face included in the input image based on the fixed length feature obtained through the existing detection model and ROI pooling without using a classification model as a deep learning model used in a face classifier.

In this case, a layer that performs the ROI pooling may correspond to a low layer close to data, and may correspond to a high layer close to a label. As the ROI pooling layer consists of a high layer, the ability to classify face-based for authentication can be improved. For example, the highest layer closest to an output layer is used as the ROI pooling layer.

Figure 6:
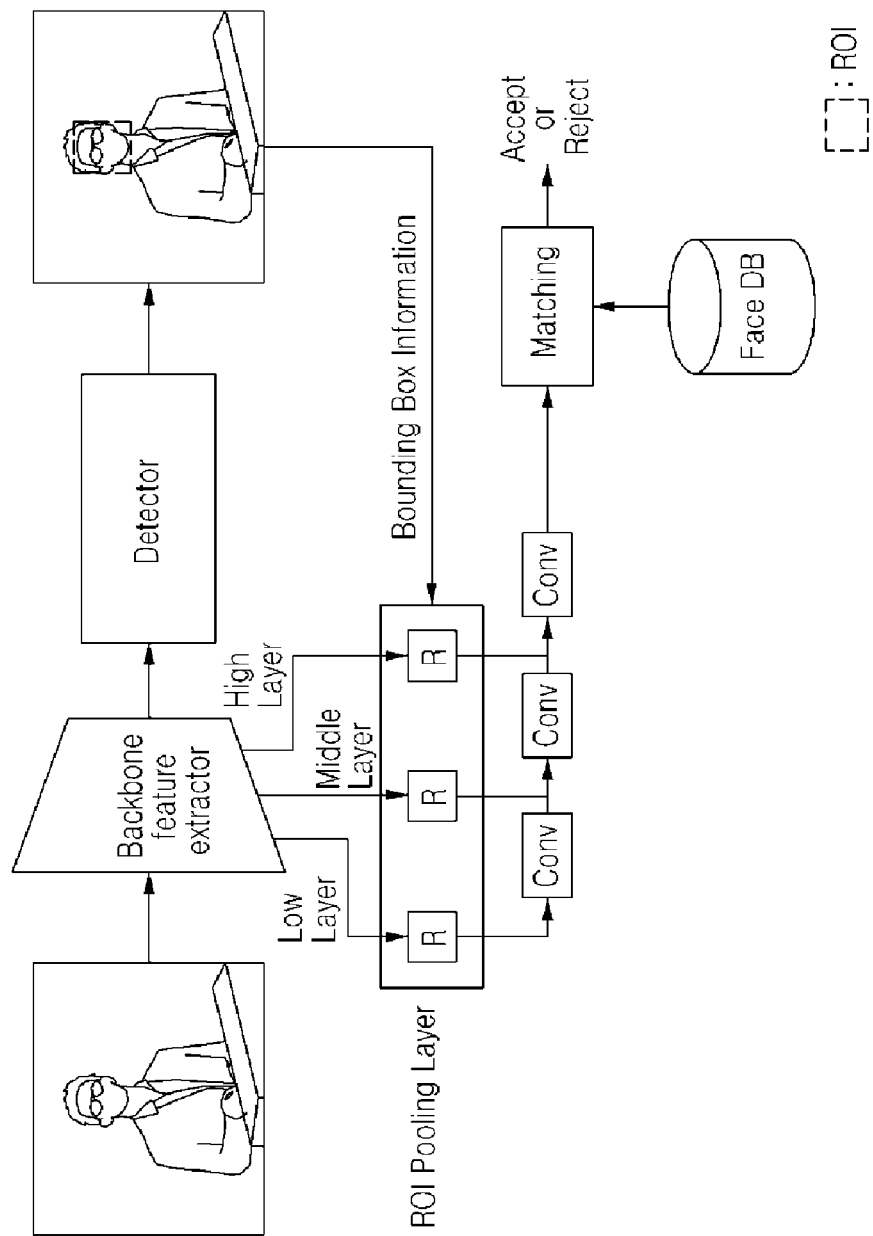
FIG. 6 is a flowchart illustrating another example of a deep learning-based authentication method which may be performed by the computer device according to an embodiment of the present disclosure.

FIG. 6 is a flowchart illustrating another example of a deep learning-based authentication method which may be performed by the computer device according to an embodiment of the present disclosure.

Referring to FIG. 6, the deep learning-based authentication system according to an embodiment of the present disclosure may perform ROI pooling in a plurality of layers in performing ROI pooling in the existing feature extractor (backbone feature extractor).

If only a backbone feature extractor is used in a registration step and a verification step, there may be a concern of low face resolution and may be a limit in that the backbone feature extractor does not provide the ability to classify a better feature than a facial feature extractor.

In order to solve such problems, in the present disclosure, ROI pooling may be performed in several layers. In particular, the deep learning-based authentication system according to an embodiment of the present disclosure may include a separate convolution layer for further extracting information between layers after performing ROI pooling in several layers.

For example, the deep learning-based authentication system according to an embodiment of the present disclosure may include a structure in which first ROI pooling is performed in a low layer of a neural network of a backbone feature extractor, second ROI pooling is performed in a middle layer of the neural network, and third ROI pooling is performed in a high layer of the neural network. In this case, the deep learning-based authentication system may be designed to include a first convolution layer for performing convolution on pooling results of the first ROI pooling, a second convolution layer for performing convolution on convolution results of the first convolution layer and pooling results of the second ROI pooling, and a third convolution layer for performing convolution on convolution results of the second convolution layer and pooling results of the third ROI pooling.

Accordingly, the deep learning-based authentication system according to an embodiment of the present disclosure uses only a feature extractor for face detection without a feature extractor for face classification, obtains a fixed length feature through ROI pooling, and uses the fixed length feature in a face-based authentication verification step in addition to a face-based authentication the registration step. Accordingly, face-based authentication can be performed with a smaller computational load by minimizing a waste operation.

Furthermore, the deep learning-based authentication system according to an embodiment of the present disclosure performs ROI pooling in the feature extractor through a plurality of layers and then extracts information between layers through a convolution layer. Accordingly, authentication performance can be guaranteed by sufficiently extracting information necessary for face-based authentication.

The deep learning-based authentication method of FIGS. 5 and 6 may not occur in the illustrated sequence, and may omit some of the steps or may further include an additional process.

The processor 110 may load, onto the memory 120, a program code stored in a program file for the deep learning-based authentication method. For example, the program file for the deep learning-based authentication method may be stored in the permanent storage device 130 described with reference to FIG. 1. The processor 110 may control the computer device 100 so that the program code is loaded from the program file stored in the permanent storage device 130 to the memory 120 through the bus. In this case, for the execution of the deep learning-based authentication method, the processor 110 and the components of the processor 110 may directly process an operation according to a control command or may control the computer device 100.

As described above, according to embodiments of the present disclosure, face-based authentication can be performed with a smaller computational load by minimizing operations performed in the face detector and the face classifier in a deep learning-based authentication technology.

The aforementioned device may be implemented as a hardware component, a software component, or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary skill in the art may understand that the processing device may include a plurality of processing elements and/or a plurality of types of processing elements. For example, the processing device may include a plurality of processors or a single processor and a single controller. Furthermore, a different processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, a computer storage medium or a device in order to be interpreted by the processing device or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means and stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The embodiments of the invention in which an exclusive property or privilege is claimed are defined as follows:

1. A deep learning-based authentication method executed in a computer device,
   wherein the computer device comprises at least one processor configured to execute computer-readable instructions included in a memory, and
   wherein a registration step and verification step for face-based authentication are performed by using only a feature extractor of a detection model for face detection without a separate feature extractor for face classification,
   wherein the deep learning-based authentication method comprises:
   detecting, by the at least one processor, a location of a region of interest (ROI) occupied by a face portion in an input image by using the detection model;
   extracting, by the at least one processor, a feature map from the input image by using the feature extractor of the detection model;
   extracting, by the at least one processor, a fixed length feature for the face portion using the feature map and ROI pooling for the detected location of the ROI; and
   classifying, by the at least one processor, a face included in the input image based on the fixed length feature,
   wherein extracting the fixed length feature comprises:
   performing a first ROI pooling for a first feature map output by a first layer of the feature extractor,
   performing a first convolution operation on results of the first ROI pooling through a first convolution layer,
   performing a second ROI pooling for a second feature map output by a second layer of the feature extractor subsequent to the first layer,
   performing a second convolution operation on results of the second ROI pooling and results of the first convolution operation through a second convolution layer,
   performing a third ROI pooling for a third feature map output by a third layer of the feature extractor subsequent to the second layer, and
   performing a third convolution operation on results of the third ROI pooling and results of the second convolution operation through a third convolution layer.

2. The deep learning-based authentication method of claim 1, wherein the third layer is a highest layer closest to an output layer of the feature extractor.

3. The deep learning-based authentication method of claim 1, wherein extracting the fixed length feature comprises performing ROI pooling for a feature map output by each of a plurality of layers of the feature extractor.

4. The deep learning-based authentication method of claim 3, wherein extracting the fixed length feature further comprises performing convolution operation after the ROI pooling for the feature map output by each of the plurality of layers.

5. A computer device comprising:
  at least one processor implemented to execute computer-readable instructions included in a memory,
  wherein the at least one processor processes:
  a registration step and verification step for face-based authentication by using only a feature extractor of a detection model for face detection without a separate feature extractor for face classification,
  a process of detecting a location of a region of interest (ROI) occupied by a face portion in an input image by using the detection model,
  a process of extracting a feature map from the input image by using the feature extractor of the detection model,
  a process of extracting a fixed length feature for the face portion using the feature map and ROI pooling for the detected location of the ROI, and
  a process of classifying a face included in the input image based on the fixed length feature,
  wherein the at least one processor processes the process of extracting the fixed length feature by
  performing a first ROI pooling for a first feature map output by a first layer of the feature extractor,
  performing a first convolution operation on results of the first ROI pooling through a first convolution layer,
  performing a second ROI pooling for a second feature map output by a second layer of the feature extractor subsequent to the first layer,
  performing a second convolution operation on results of the second ROI pooling and results of the first convolution operation through a second convolution layer,
  performing a third ROI pooling for a third feature map output by a third layer of the feature extractor subsequent to the second layer, and
  performing a third convolution operation on results of the third ROI pooling and results of the second convolution operation through a third convolution layer.

6. The computer device of claim 5, wherein the third layer is a highest layer closest to an output layer of the feature extractor.

7. The computer device of claim 5, wherein in order to extract the fixed length feature, the at least one processor performs ROI pooling for a feature map output by each of a plurality of layers of the feature extractor.

8. The computer device of claim 7, wherein in order to extract the fixed length feature, the at least one processor performs convolution operation after the ROI pooling for the feature map output by each of the plurality of layers.

* * * * *